UNITED STATES PATENT OFFICE.

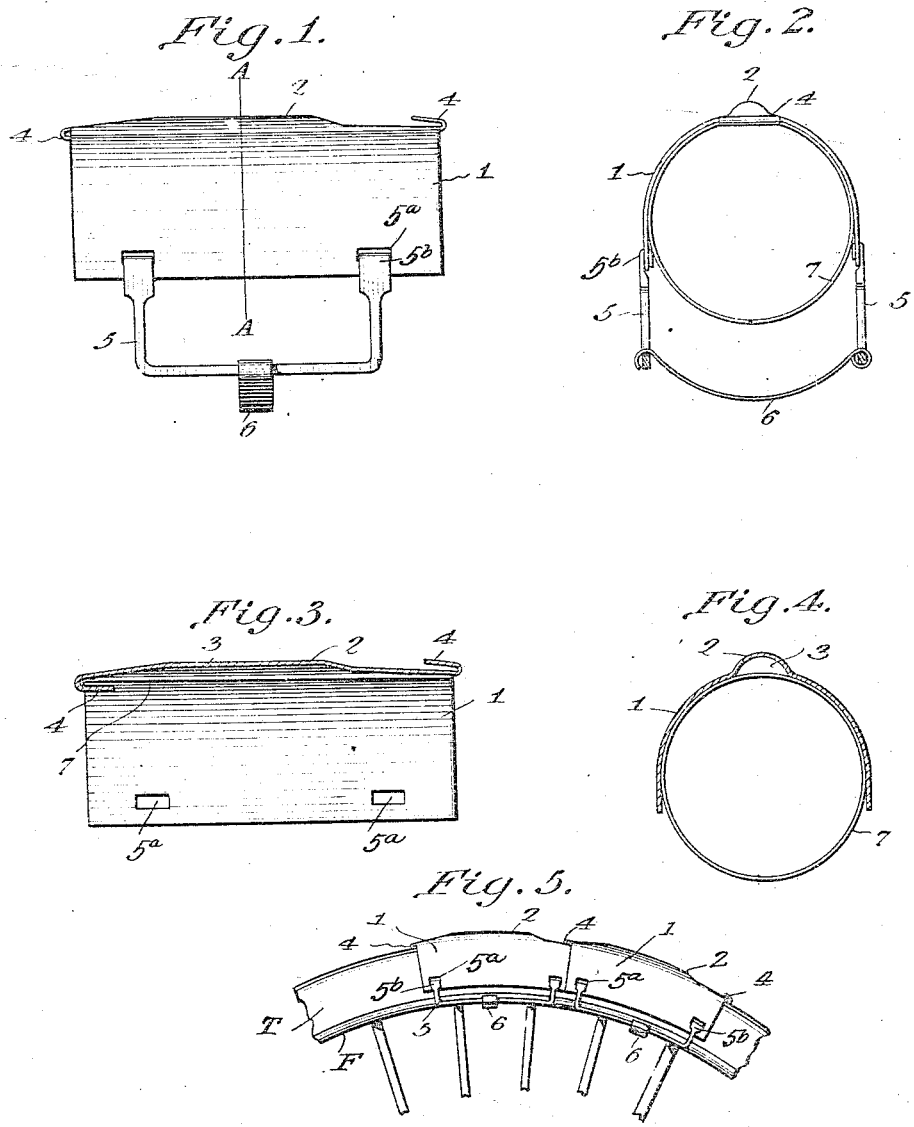

GEORGE W. CHILDERS AND HARBIN D. BORST, OF SAN DIEGO, CALIFORNIA.

TIRE-ARMOR.

1,136,774.

Specification of Letters Patent.

Patented Apr. 20, 1915.

Application filed August 20, 1913. Serial No. 785,825.

*To all whom it may concern:*

Be it known that we, GEORGE W. CHILDERS and HARBIN D. BORST, citizens of the United States of America, and residents of San Diego, in the county of San Diego and State of California, have invented certain new and useful Improvements in Tire-Armors, of which the following is a specification.

This invention relates to tire armors and the object thereof is to provide a simply constructed tire casing or armor which is puncture proof and which will not affect the resiliency of the tire.

With the above and other objects in view, the invention consists of certain novel features of construction, and the combination and arrangement of parts as will be more fully described and claimed.

In the accompanying drawings: Figure 1 is a side elevation of one section of this improved armor; Fig. 2 is a transverse section thereof; Fig. 3 is a central longitudinal section of one of the armor sections; Fig. 4 is a transverse vertical section taken on the line A—A of Fig. 1; and Fig. 5 is a side elevation of a portion of a wheel equipped with this improved armor.

In the embodiment illustrated, a tire armor is shown composed of a plurality of sections 1 preferably constructed of spring metal and shown with a bulge 2 in its tread for a purpose to be described.

The ends of the sections 1 are flexibly connected in any suitable manner, outwardly and inwardly extending hooks 4 and 4ª being here shown disposed at opposite ends of each section. The outwardly extending hook 4 on one end of a section is designed to engage the inturned hook on the adjacent end of another section arranged in peripheral alinement therewith.

Each section 1 is curved transversely to correspond with the curvature of the pneumatic tire to which it is to be applied and is designed to embrace the tread and to extend well over the sides of the tire as shown in Fig. 5. The tread portion of each section is provided with an outwardly bulged longitudinally extending portion 2 which performs the double function of an anti-skidding device and of means for producing an air space or chamber 3 for preventing blistering of the tire. The sections 1 are each provided adjacent their free side edges with longitudinally spaced apertures 5ª to receive the ends of attaching elements here shown in the form of U-shaped springs 5, the free ends of the arms of which are equipped with hooks 5ᵇ which engage the apertures 5ª on one side of the section as shown in Fig. 1.

A spring clasp 6 is connected at one end with the cross bar of the member 5 attached to one side of one of the sections 1 and is adapted to pass transversely under the felly F of the wheel and to be detachably engaged with the cross bar of the member 5 at the opposite side of said section, whereby the section is yieldably and securely fastened on the tire T.

The casing or armor is constructed by flexibly connecting the ends of a sufficient number of sections 1 to provide a flexible armor, the inside length of which is slightly less than the length of the extreme outside of the tire to insure a tight fit of the armor on the tread and sides of the tire. This armor is applied while the tire is deflated, a fabric or plastic lining 7 having first been placed over the tire to prevent wear when the armor is positioned thereon. After the tire is placed in position, the clasps 6 are passed across the felly and attached to the cross bars of the members 5 on the opposite sides of the armor and the tire is then inflated and ready for use.

It will be noted, by reference to Figs. 1 and 5, that the cross bars of the bails 5 lie substantially concentric to the armor, and that the transverse clips or bars 6 are so engaged with these cross bars as to allow said clips or bars to be adjusted longitudinally on the cross bars. This becomes advantageous when applying the armor to the tire of a wheel in which certain of the spokes might come directly opposite the centers of certain of the bails. Should this be the case, the clips 6 may be adjusted to position them to one side of the spokes.

In Fig. 1, the cross bar of the bail 5 is shown of rectilinear formation while in Fig. 5, these bars are shown as slightly curved. Either formation will operate successfully for producing the above result.

We claim as our invention:

1. The combination with a circular tire armor comprising a plurality of connected sections, of U-shaped bails having their arms connected to the opposite sides of said sections, the cross bars of said bails being substantially concentric with the armor, and a plurality of transverse retaining members extending from the cross bars of the bails on one side of the armor, to those on the other side thereof, said members being adjustable longitudinally on said cross bars for the purpose set forth.

2. The combination with a circular tire armor, of a plurality of U-shaped bails whose arms are secured to the opposite sides of said armor, said bails being positioned in transversely alined pairs and having their cross bars lying substantially concentric with the armor, and transverse retaining members whose ends are mounted on and adjustable longitudinally on said cross bars of the bails, for the purpose set forth.

G. W. CHILDERS
H. D. BORST.

Witnesses:
F. E. GRAHAM,
RAYMOND M. DAVIS.